United States Patent
Liu et al.

(10) Patent No.: US 12,147,431 B2
(45) Date of Patent: Nov. 19, 2024

(54) METHOD AND APPARATUS FOR PUSHING RESOURCE, AND STORAGE MEDIUM

(71) Applicant: BEIJING BAIDU NETCOM SCIENCE TECHNOLOGY CO., LTD., Beijing (CN)

(72) Inventors: Haocheng Liu, Beijing (CN); Jingyu Xu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/060,736

(22) Filed: Dec. 1, 2022

(65) Prior Publication Data
US 2023/0095947 A1 Mar. 30, 2023

(30) Foreign Application Priority Data
Dec. 16, 2021 (CN) .......................... 202111546924.8

(51) Int. Cl.
*G06F 16/2457* (2019.01)
*G06F 16/28* (2019.01)

(52) U.S. Cl.
CPC ........ *G06F 16/2457* (2019.01); *G06F 16/285* (2019.01)

(58) Field of Classification Search
CPC ........................... G06F 16/2457; G06F 16/285
See application file for complete search history.

(56) References Cited

U.S. PATENT DOCUMENTS

| 10,122,824 | B1* | 11/2018 | Chokhawala | H04L 67/63 |
| 10,915,929 | B1* | 2/2021 | Huang | H04N 21/4758 |
| 10,991,028 | B1* | 4/2021 | Aubrey | G06Q 30/0641 |
| 11,062,360 | B1* | 7/2021 | Donamukkala | G06N 20/00 |
| 11,188,830 | B2* | 11/2021 | Li | G06N 5/022 |
| 11,227,309 | B2* | 1/2022 | Yan | G06Q 30/0251 |

(Continued)

FOREIGN PATENT DOCUMENTS

| CN | 108241667 A | 7/2018 |
| CN | 108259546 A | 7/2018 |

(Continued)

OTHER PUBLICATIONS

Office Action issued in corresponding CN Application No. 202111546924.8 dated Mar. 18, 2023 (18 pages).

(Continued)

*Primary Examiner* — Tarek Chbouki
(74) *Attorney, Agent, or Firm* — Osha Bergman Watanabe & Burton LLP (57) ABSTRACT

A method for pushing a resource includes obtaining a collection of users to which a resource is to be pushed, in which the collection includes a plurality of users; obtaining respective predicted conversion rates of the resource for the plurality of users; obtaining user groups by dividing the plurality of users into groups based on respective predicted conversion rates for the plurality of users, in which the user groups correspond to different conversion rate ranges; and for each user group, selecting a target user from the user group based on a real conversion rate related to pushed users corresponding to the conversion rate range of the user group, and pushing the resource to the target user.

20 Claims, 5 Drawing Sheets

(56) References Cited

U.S. PATENT DOCUMENTS

| | | | |
|---|---|---|---|
| 11,610,222 B1* | 3/2023 | Xiong | G06Q 30/0242 |
| 2008/0307317 A1* | 12/2008 | Yohai-Giochais | H04L 67/02 |
| | | | 715/748 |
| 2011/0196821 A1* | 8/2011 | Hellerman | G06F 16/958 |
| | | | 707/E17.014 |
| 2013/0103493 A1* | 4/2013 | Gao | G06Q 30/0241 |
| | | | 707/706 |
| 2015/0227517 A1* | 8/2015 | Lymberopoulos | G06F 16/172 |
| | | | 707/706 |
| 2015/0319509 A1* | 11/2015 | Huang | H04N 21/482 |
| | | | 725/53 |
| 2018/0276708 A1 | 9/2018 | Myers et al. | |
| 2020/0357013 A1 | 11/2020 | Yang et al. | |
| 2021/0150547 A1* | 5/2021 | Cassel | G06Q 30/01 |
| 2021/0174389 A1* | 6/2021 | Barajas Zamora | |
| | | | G06Q 30/0246 |
| 2021/0182904 A1* | 6/2021 | Periyathambi | G06Q 30/0254 |
| 2022/0131769 A1* | 4/2022 | Dille | G06F 11/3409 |
| 2022/0188812 A1* | 6/2022 | Petersen | G06Q 20/02 |
| 2022/0237597 A1* | 7/2022 | Petersen | G06Q 20/381 |
| 2023/0124461 A1* | 4/2023 | Lin | H04N 21/4788 |
| | | | 715/708 |
| 2023/0342797 A1* | 10/2023 | Qiao | G06Q 30/0202 |
| 2023/0376809 A1* | 11/2023 | Yates | G06Q 30/0201 |

FOREIGN PATENT DOCUMENTS

| | | |
|---|---|---|
| CN | 111130984 A | 5/2020 |
| CN | 111160959 A | 5/2020 |
| CN | 111626780 A | 9/2020 |
| CN | 113239275 A | 8/2021 |
| CN | 113515696 A | 10/2021 |
| EP | 2960849 A1 | 12/2015 |
| WO | 2019169977 A1 | 9/2019 |

OTHER PUBLICATIONS

Extended European Search Report issued in corresponding EP application 22211331.8 dated Apr. 5, 2023 (9 pages).

Wen-Di, Ji et al. "Techniques for estimating click-through rates of Web advertisements: A survey" Journal of East China Normal University (Natural Science) No. May 3, 2013 (26 pages).

Deng, Juan "User Interest Under The Change of the Optimal Recommended Simulation Collaborative Filtering" City College Wuhan University of Science and Technology, Aug. 2016 (10 pages).

Cui, Yan-ping et al. "Research on the Optimization of the Internet Information Resource Users to Obtain the Simulation" Wuhan ordnance Academy Command and control Department Jul. 2017 (11 pages).

* cited by examiner

METHOD AND APPARATUS FOR PUSHING RESOURCE, AND STORAGE MEDIUM

CROSS REFERENCE TO RELATED APPLICATIONS

This application claims priority and benefits to Chinese Application No. 202111546924.8, filed on Dec. 16, 2021, the entire content of which is incorporated herein by reference.

TECHNICAL FIELD

The disclosure relates to a field of computer technologies, especially fields of big data mining and artificial intelligence technologies, in particular to a method for pushing a resource, an apparatus for pushing a resource, and a storage medium.

BACKGROUND

With the rapid development of the Internet technologies, pushing the resource via the Internet has gradually become a mainstream pushing method. In the process of pushing the resource to users, the accuracy of the pushing strategy directly affects the use of the resource.

SUMMARY

According to a first aspect of the disclosure, a method for pushing a resource is provided. The method includes: obtaining a collection of users to which a resource is to be pushed, in which the collection includes a plurality of users; obtaining respective predicted conversion rates of the resource for the plurality of users; obtaining user groups by dividing the plurality of users into groups based on respective predicted conversion rates for the plurality of users, in which the user groups correspond to different conversion rate ranges; and for each user group, selecting a target user from the user group based on a real conversion rate related to pushed users corresponding to the conversion rate range of the user group, and pushing the resource to the target user.

According to a second aspect of the disclosure, an electronic device is provided. The electronic device includes: at least one processor and a memory communicatively coupled to the at least one processor. The memory stores instructions executable by the at least one processor, and when the instructions are executed by the at least one processor, the at least one processor is caused to implement the method for pushing a resource.

According to a third aspect of the disclosure, a non-transitory computer-readable storage medium having computer instructions stored thereon is provided. The computer instructions are configured to cause a computer to implement the method for pushing a resource.

It is understandable that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure.

DETAILED DESCRIPTION

The following describes the embodiments of the disclosure with reference to the accompanying drawings, which includes various details of the embodiments of the disclosure to facilitate understanding, which shall be considered as merely examples. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

A method for pushing a resource, an apparatus for pushing a resource, and a storage medium according to the embodiments of the disclosure will be described below with reference to the accompanying drawings.

In the process of pushing the resource to the users, the plurality of users are divided into user groups based on the predicted conversion rates of the resource for the plurality of users. For each user group, one or more target users are selected from the user group based on the real conversion rate related to the pushed users corresponding to the conversion rate range of the user group, and the resource is pushed to the target users. Therefore, the resource can be accurately pushed to the users, thereby improving the user conversion rate of the resource.

Figure 1:
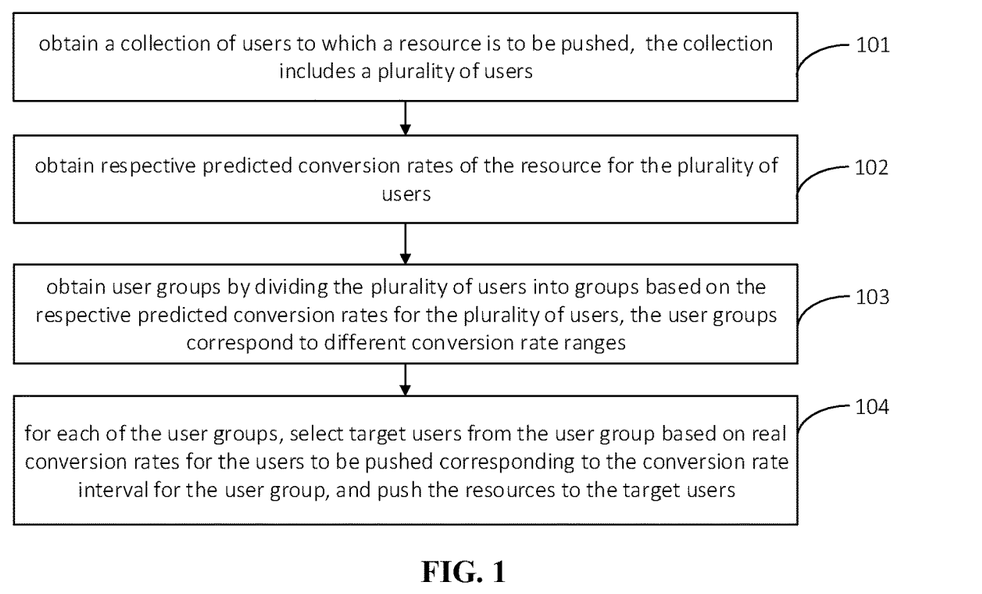
FIG. 1 is a flowchart illustrating a method for pushing a resource according to some embodiments of the disclosure.

FIG. 1 is a flowchart illustrating a method for pushing a resource according to some embodiments of the disclosure.

As illustrated in FIG. 1, the method for pushing a resource includes the following.

At block 101, a collection of users to which a resource is to be pushed is obtained. The collection of users includes a plurality of users.

The above-mentioned "resource" is a resource generated when pushing an object to be pushed. The resource may include at least one of text information, image information and video information corresponding to the object to be pushed.

The above-mentioned "object to be pushed" may include, but is not limited to, a commodity, a financial product, a course, or an official account.

At block 102, respective predicted conversion rates of the resource for the plurality of users are obtained.

The predicted conversion rate is a predicted probability that after the resource is pushed to the user, the user clicks on the resource and completes a specified operation on a landing page corresponding to the resource.

The above-mentioned "specified operation" is related to the object to be pushed, that is, the specified operation corresponds to the object to be pushed. For example, if the object to be pushed is a product, the specified operation corresponding to the product may be an operation of purchasing the product. If the object to be pushed is a financial product, the specified operation corresponding to the financial product may be an operation of registration on the financial product. If the object to be pushed is an official account, the specified operation corresponding to the official account may be an operation of following the official account.

It is understandable that the specified operations corresponding to different objects to be pushed can be the same or different. In practical applications, the specified operation can be set for the object to be pushed according to actual service requirements.

At block 103, a plurality of user groups are obtained by dividing the plurality of users into groups based on the respective predicted conversion rates of the plurality of users. Conversion rate ranges corresponding to the user groups are different.

As an example, the users are divided into groups based on preset conversion rate ranges in combination with the respective predicted conversion rates of the users.

It is understandable that for each user group, the predicted conversion rates corresponding to users contained in the user group are all within the conversion rate range.

The difference between the upper limit and the lower limit of each conversion rate range may be the same or different, which is not limited in embodiments of the disclosure.

At block 104, for each user group, a target user is selected from the user group based on a real conversion rate related to pushed users corresponding to the conversion rate range of the user group, and the resource is pushed to the target user.

A correspondence between the conversion rate ranges and the real conversion rates can be stored in advance such that the real conversion rates for the users that have been pushed with the resource corresponding to the conversion rate interval for the user group may be obtained based on a correspondence between a pre-saved conversion rate interval and the real conversion rates.

The above-mentioned "pushed users" are users that have been pushed with the resource.

For any conversion rate range, the real conversion rate related to the pushed users corresponding to the conversion rate range is determined in the following ways. The number of converted users contained in the pushed users is determined and the real conversion rate related to the pushed users corresponding to the conversion rate range is determined based on the number of converted users and the total number of the pushed users.

In an implementation, there may be multiple target users. Selecting the target users from the user group according to the real conversion rate includes multiplying the real conversion rate with the number of users contained in the user group to obtain a product result as the number of users to be extracted, and randomly selecting the target users from the user group based on the number of users to be extracted, in which the number of selected target users is equal to the number of users to be extracted.

In another implementation, there may be multiple target users. Selecting the target users from the user group according to the real conversion rate includes multiplying the real conversion rate with the number of users contained in the user group to obtain a product result as the number N of users to be extracted, sorting the users in a descending order according to the predicted conversion rates to obtain a sorting result, and selecting N users that are ranked first in the sorting result as the target users.

In still another implementation, there may be multiple target users. Selecting the target users from a user group according to the real conversion rate includes equidistantly selecting users from the user group according to the real conversion rate corresponding to the user group, and determining the selected users as the target users.

According to embodiments of the disclosure, in the process of pushing the resource to the users, the plurality of users are divided into user groups based on the predicted conversion rates of the resource for the plurality of users. For each user group, the target users are selected from the user group based on the real conversion rate related to the pushed users corresponding to the conversion rate range of the user group, and the resource is pushed to the target users. Therefore, the users to which the resource is to be pushed are further screened based on the predicted conversion rates and the real conversion rate, and the resource is pushed to the selected users such that the resource can be accurately pushed to the users, thereby improving the user conversion rate of the resource.

In the method for pushing a resource according to embodiments of the disclosure, in the process of pushing the resource to the users, the users are divided into user groups based on the predicted conversion rates of the users, for each user group, the target users are selected from the user group based on the real conversion rate related to the pushed users corresponding to the conversion rate range of the user group, and the resource is pushed to the target users. Thus, the resource can be accurately pushed to the users, thereby improving the user conversion rate of the resource.

Figure 2:
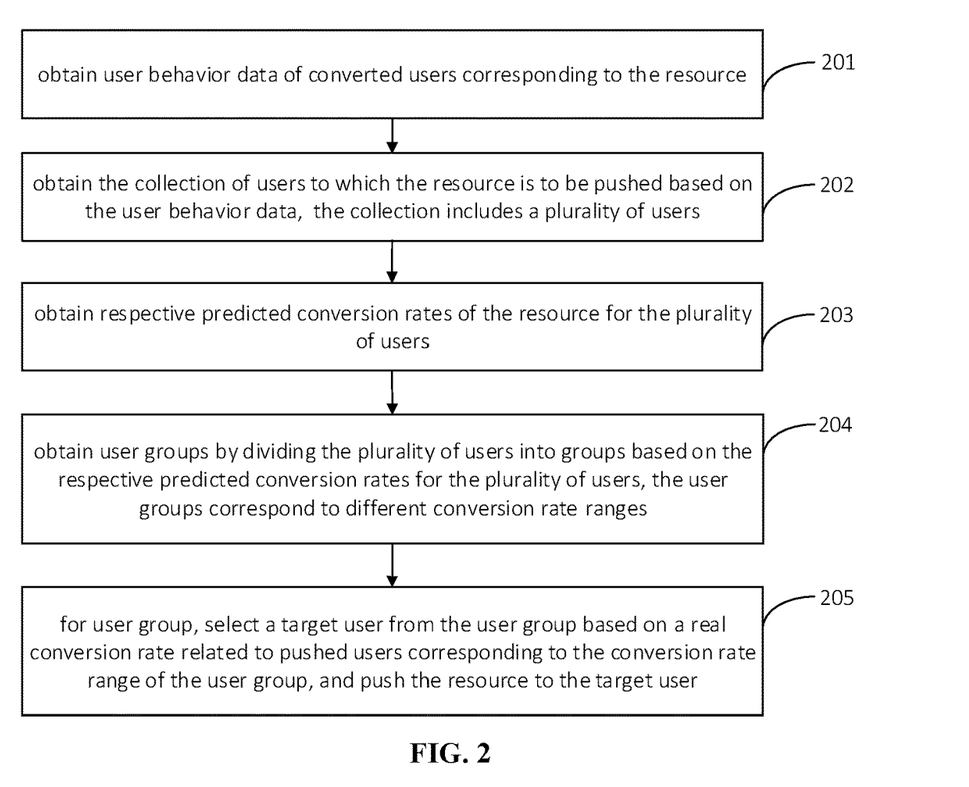
FIG. 2 is a flowchart illustrating a method for pushing a resource according to some embodiments of the disclosure.

FIG. 2 is a flowchart illustrating a method for pushing a resource according to some embodiments of the disclosure. It is noteworthy that this embodiment is a further refinement of the above-mentioned embodiment of FIG. 1.

As illustrated in FIG. 2, the method for pushing a resource includes the following.

At block 201, user behavior data of converted users corresponding to the resource is obtained.

The above-mentioned "converted users" are users who has clicked on the resource and completed the specified operation on the landing page corresponding to the resource.

The above-mentioned "user behavior data" may include one or more of data of viewing behaviors, data of browsing behaviors, data of click behaviors and data of search behaviors.

It is understandable that the above user behavior data is related to promotion channels, and the user behavior data corresponding to different promotion channels are different. For example, if the promotion channel is search engine, the user behavior data includes data of user search behaviors. If the promotion channel is video service platform, the user behavior data may include data of user viewing behaviors. If the promotion channel is social platform for sharing short real-time information, and the user behavior data may include historically released information and data of user browsing behaviors.

In some embodiments of the disclosure, in order to further improve the accuracy of pushing the resource, the promotion channel of the resource can be obtained, and the user behavior data of the converted users when the resource is promoted via the promotion channel is obtained.

At block 202, the collection of users to which the resource is to be pushed is obtained based on the user behavior data. The collection of the users includes a plurality of users.

The users to be pushed with the resource can be accurately determined based on the user behavior data of the converted users. Thus, the accuracy of subsequently pushing the resource and the conversion rate can be further improved.

The users contained in one collection are users who use the promotion channel.

At block 203, respective predicted conversion rates of the resource for the plurality of users are obtained.

At block 204, a plurality of user groups are obtained by dividing the plurality of users into groups based on the respective predicted conversion rates for the plurality of users. Conversion rate ranges corresponding to the user groups are different from each other.

At block 205, for each user group, a target user is selected from the user group based on the real conversion rate related to the pushed users corresponding to the conversion rate range of the user group, and the resource is pushed to the target user.

It is noteworthy that, for the specific description of blocks 204 to 205, reference may be made to the relevant descriptions of the foregoing embodiments, and details are not repeated here.

In the process of obtaining the users to which the resource is to be pushed, the users to which the resource is to be pushed are accurately determined based on the user behavior data of the converted users, and the selection is further performed on the users to which the resource is to be pushed based on the respective predicted conversion rates of the users, and the resource is pushed to the selected target users, such that the accuracy of pushing the resource is improved and the user conversion rate for the resource is increased.

It is understandable that the method for pushing a resource according to embodiments of the disclosure may be applied to various promotion channels. That is, for different promotion channels, the target users of the resource on the corresponding promotion channel may be determined based on the method disclosed in the embodiments of the disclosure.

Figure 3:
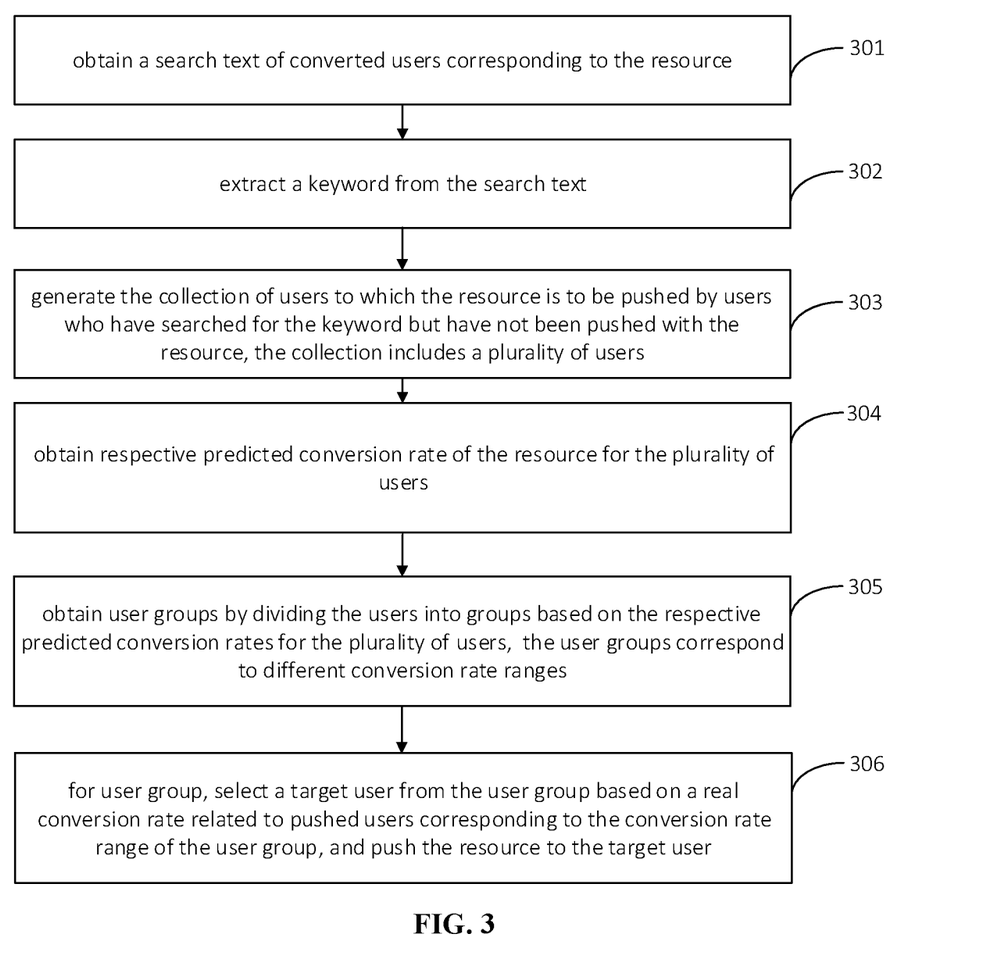
FIG. 3 is a flowchart illustrating a method for pushing a resource according to some embodiments of the disclosure.

FIG. 3 is a flowchart illustrating a method for pushing a resource according to some embodiments of the disclosure. In embodiments of FIG. 3, the user behavior data including a search text, which is taken as an example for description.

As illustrated in FIG. 3, the method further includes the following.

At block 301, a search text of the converted users corresponding to the resource is obtained.

At block 302, a keyword is extracted from the search text.

Extracting the keyword from the search text can be achieved in various ways.

As an implementation, the search text is input into a keyword extraction model to obtain the keyword in the search text determined by the keyword extraction model.

As another implementation, a word segmenting result is obtained by performing a word segmenting on the search text. The word segmenting result includes multiple words. A clustering process is performed on the words in the word segmenting result to obtain a plurality of word clustering results. The keyword in the search text is determined based on the plurality of word clustering results.

The key word in the search text can be accurately determined based on the word clustering results that are obtained by clustering the word segmenting result of the search text.

For example, in order to accurately determine the keyword in the search text, determining the keyword in the search text according to the word clustering results includes determining respective clustering center words corresponding to the word clustering results; obtaining term frequencies of the clustering center words in the search text respectively; and determining the clustering center word with the highest term frequency as the keyword in the search text.

There may be two or more clustering center words with the highest term frequency.

The term frequency means the frequency of occurrence of the term.

As an implementation, determining the respective clustering center words corresponding to the word clustering results is: for each word contained in a word clustering result, determining respective distances between the word and other words contained in the word clustering result and determining a sum of the respective distances, and determining a word with a smallest sum as the clustering center word of the word clustering result.

At block 303, the collection of users to which the resource to be pushed is formed by users who have searched for the keyword but have not been pushed with the resource. The collection of users includes a plurality of users.

At block 304, respective predicted conversion rates of the resource for the plurality of users are obtained.

In order to accurately obtain the respective predicted conversion rates of the resource for the plurality of users, for each user, user feature information of the user on a service platform to which an object to be pushed of the resource belongs is obtained, and the predicted conversion rate of the resource for the user is determined according to the user feature information.

Obtaining the user feature information of the user on the service platform to which the object to be pushed of the resource belongs includes: obtaining the user behavior information of the user on the service platform to which the object to be pushed of the resource belongs, and extracting the user feature information related to the conversion rate from the user behavior data.

In different application scenarios, the respective predicted conversion rates of the resource for the plurality of users can be determined based on the user feature information in various ways.

As an implementation, for each user, feature information of the object to be pushed of the resource is obtained, and the user feature information and the feature information of the object are input into a conversion rate prediction model, to obtain the predicted conversion rate of the resource for the user determined by the conversion rate prediction model.

As another implementation, in order to improve the accuracy of the determined predicted conversion rate, the conversion rate estimation model corresponding to the resource can be obtained, and the user feature data is input into the conversion rate estimation model to obtain the predicted conversion rate of the resource for the user.

At block 305, a plurality of user groups are obtained by dividing the plurality of users into groups based on the respective predicted conversion rate for the plurality of users. Conversion rate ranges corresponding to the user groups are different.

At block 306, for each user group, a target user is selected from the user group based on a real conversion rate related to pushed users corresponding to the conversion rate range of the user group, and the resource is pushed to the target users.

It is noteworthy that, for the specific description of blocks 305 to 306, reference may be made to the relevant descriptions of the foregoing embodiments, and details are not repeated here.

In embodiments of the disclosure, the search text of the converted users corresponding to the resource is obtained, the keyword is extracted from the search text, and users who have searched for the keyword but have not been pushed with the resource are determined as the users to which the resource is to be pushed. Thus, the users to which the resource is to be pushed are accurately determined based on the keyword in the search text.

The method for pushing a resource according to embodiments of the disclosure will be further described below with reference to FIG. 4. It is noteworthy that, in embodiments of FIG. 4, the promotion channel is search engine, which is taken as an example for description.

Figure 4:
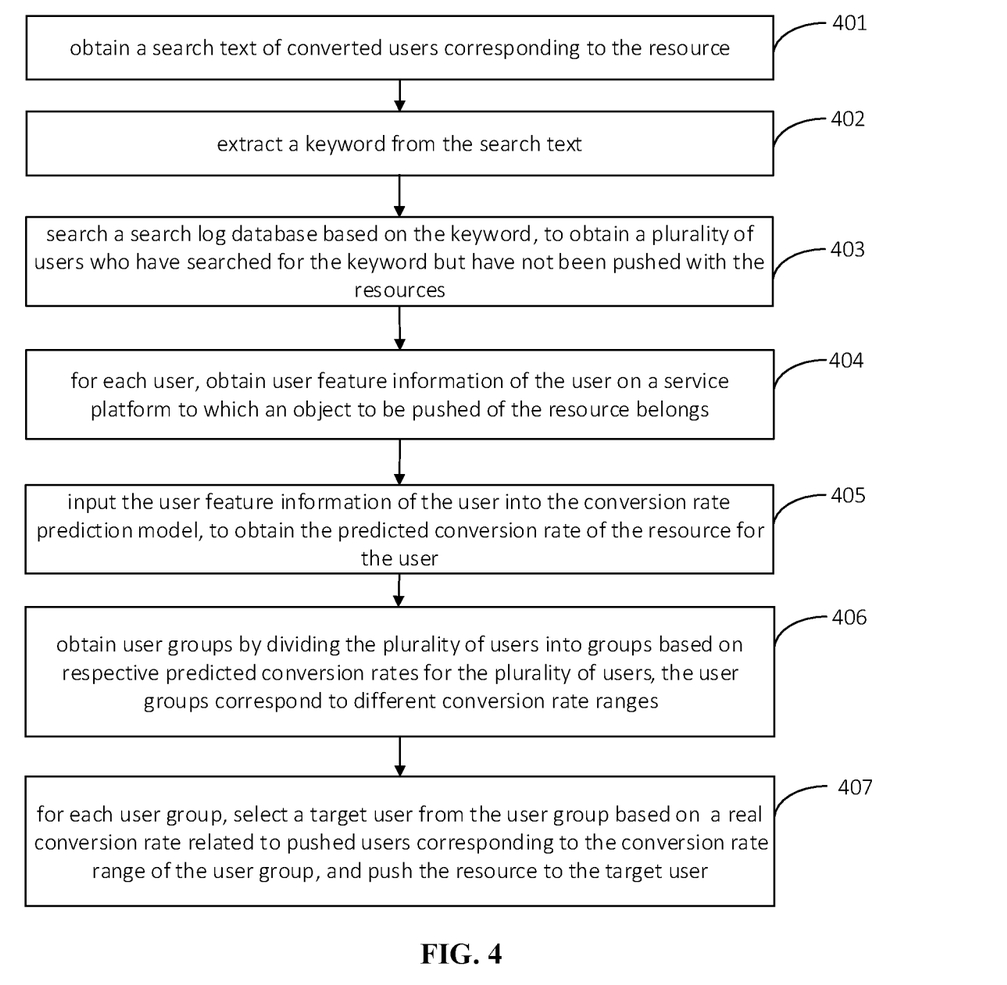
FIG. 4 is a flowchart illustrating a method for pushing a resource according to some embodiments of the disclosure.

As illustrated in FIG. 4, the method includes the following.

At block 401, a search text of converted users of the resource is obtained.

At block 402, a keyword is extracted from the search text.

Figure 5:
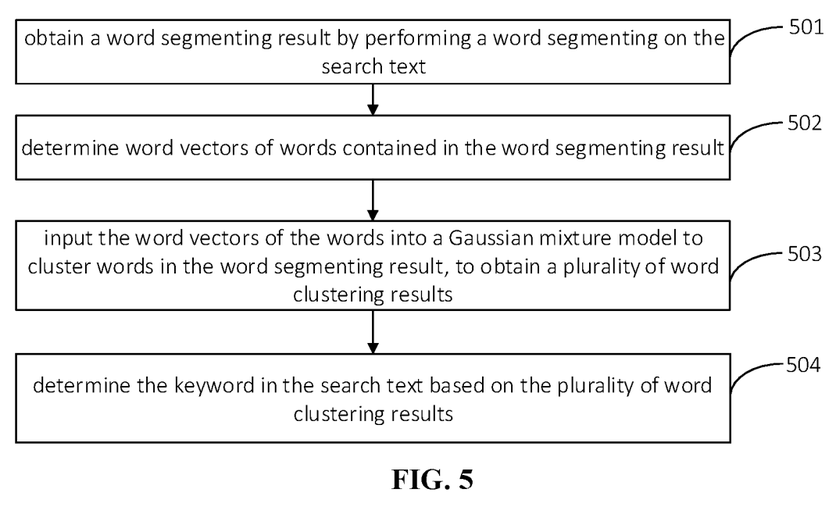
FIG. 5 is a flowchart illustrating a method for pushing a resource according to some embodiments of the disclosure.

An example of extracting the keyword from the search text is illustrated in FIG. 5. As illustrated in FIG. 5, the method includes the following. At block 501, a word segmenting is performed on the search text to obtain a word segmenting result. At block 502, respective word vectors are determined for words contained in the word segmentation result. At block 503, the word vectors are input into a Gaussian mixture model, so that the words in the word segmentation result are clustered by the Gaussian mixture model, to obtain clustering results. At block 504, the keyword in the search text is determined based on the clustering results.

In detail, the term frequency of the clustering center word in a clustering result is counted, and the clustering center word with the highest term frequency is determined as the keyword of the search text.

At block 403, a search log library is searched based on the keyword to obtain a plurality of users who have searched for the keyword but have not been pushed with the resource.

At block 404, for each of the plurality of users, user feature information of the user on the service platform to which the object to be pushed of the resource belongs is obtained.

At block 405, the user feature information is input into a conversion rate prediction model to obtain the predicted conversion rate of the resource for the user.

At block 406, a plurality of user groups are obtained by dividing the plurality of users into groups based on the respective predicted conversion rates for the plurality of users. Different user groups correspond to different conversion rate ranges.

At block 407, for each user group, a target user is selected from the user group based on a real conversion rate related to pushed users corresponding to the conversion rate range of the user group, and the resource is pushed to the target user.

It is noteworthy that, for the specific description of blocks 406 to 407, reference may be made to the relevant descriptions of the foregoing embodiments, and details are not repeated here.

In order to expand the number of target users, the above real conversion rate may be expanded by a preset multiplier.

For example, the preset multiplier is 10, and the real conversion rates corresponding to the conversion rate ranges are shown in Table 1. The expanded real conversion rates corresponding to the conversion rate ranges obtained after expanding the real conversion rates corresponding to the conversion rate ranges by 10 respectively is shown in the third column of Table 1.

| conversion rate range | real conversion rate | expanded real conversion rate |
| --- | --- | --- |
| (0, 0.1) | 0.2% | 2% |
| (0.1, 0.2) | 0.4% | 4% |
| . . . | . . . | . . . |
| (0.8, 0.9) | 1.6% | 16% |
| (0.9, 1.0) | 2.1% | 21% |

In order to implement the above, embodiments of the disclosure further provides an apparatus for pushing a resource.

Figure 6:
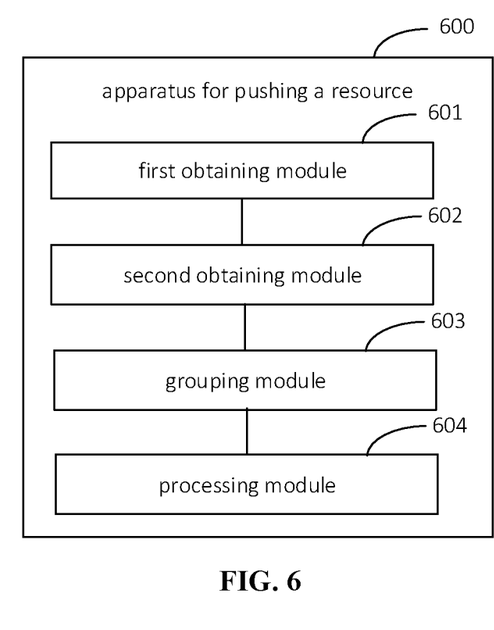
FIG. 6 is a schematic diagram illustrating an apparatus for pushing a resource according to some embodiments of the disclosure.

FIG. 6 is a schematic diagram illustrating an apparatus for pushing a resource according to some embodiments of the disclosure.

As illustrated in FIG. 6, the apparatus 600 for pushing a resource includes: a first obtaining module 601, a second obtaining module 602, a dividing module 603, and a processing module 604.

The first obtaining module 601 is configured to obtain a collection of users to which a resource is to be pushed. The collection of users includes a plurality of users.

The second obtaining module 602 is configured to obtain respective predicted conversion rates of the resource for the plurality of users.

The dividing module 603 is configured to obtain a plurality of user groups by dividing the plurality of users into groups based on the respective predicted conversion rates of the resource for the plurality of users. The user groups correspond to different conversion rate ranges.

The processing module 604 is configured to, for each user group, select a target user from the user group based on a real conversion rate related to pushed users corresponding to the conversion rate range of the user group, and push the resource to the target user.

It is noteworthy that, the above explanations on the embodiments of the method for pushing a resource are also applicable to this embodiment, which will not be repeated here.

With the apparatus for pushing a resource according to embodiments of the disclosure, in the process of pushing the resource to users, the plurality of users are divided into groups according to the respective predicted conversion rates of the resource for the plurality of users to obtain the plurality of user groups. For each user group, the target user is selected from the user group based on the real conversion rate related to the pushed users corresponding to the conversion rate range of the user group, and the resource is pushed to the target user. Therefore, the resource can be accurately pushed to improve the user conversion rate of the resource.

Figure 7:
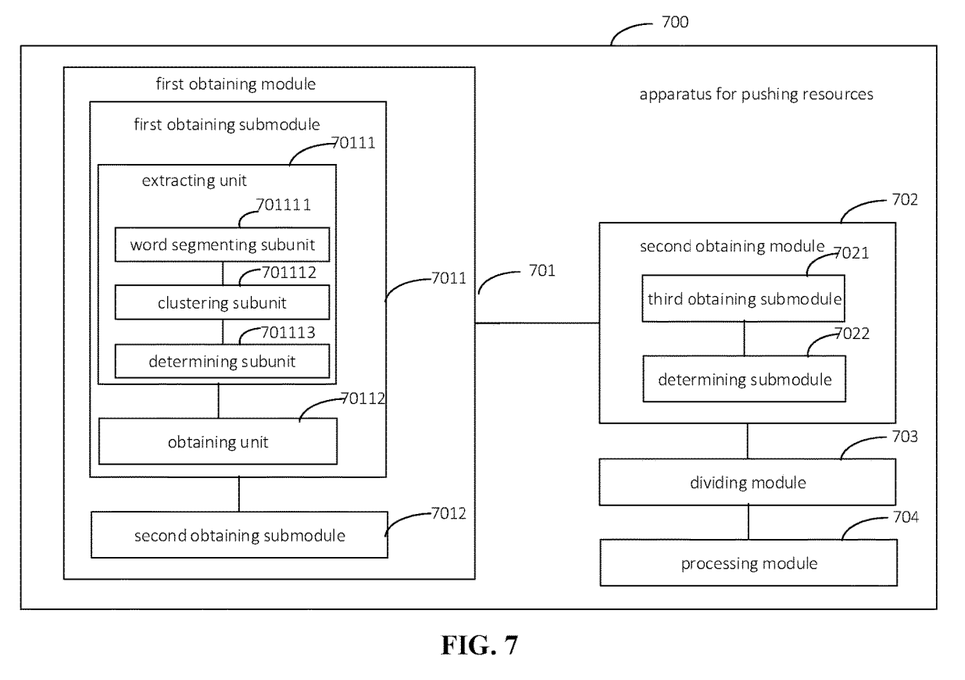
FIG. 7 is a schematic diagram illustrating an apparatus for pushing a resource according to some embodiments of the disclosure.

As illustrated in FIG. 7, an apparatus 700 for pushing a resource may include: a first obtaining module 701, a second obtaining module 702, a dividing module 703 and a processing module 704. The first obtaining module 701 includes a first obtaining submodule 7011 and a second obtaining submodule 7012. The second obtaining submodule 7011 includes an extracting unit 70111 and an obtaining unit 70112. The extracting unit 70111 includes a word segmenting subunit 701111, a clustering subunit 701112 and a determining subunit 701113. The second obtaining module

702 includes a third obtaining submodule 7021 and a determining submodule 7022.

It is noteworthy that, for the detailed description of the dividing module 703 and the processing module 704, reference may be made to the descriptions of the dividing module 603 and the processing module 604 in embodiments of FIG. 6, which will not be described here.

The first obtaining module 701 includes a first obtaining submodule 7011 and a second obtaining submodule 7012.

The first obtaining submodule 7011 is configured to obtain user behavior data of converted users corresponding to the resource.

The second obtaining submodule 7012 is configured to obtain the collection of users to which the resource is to be pushed based on the user behavior data.

The user behavior data includes a search text. The second obtaining submodule 7011 includes an extracting unit 70111 and an obtaining unit 70112.

The extracting unit 70111 is configured to extract a keyword from the search text.

The obtaining unit 70112 is configured to generate the collection of users to which the resource is to be pushed formed by a plurality of users who have searched for the keyword but have not been pushed with the resource.

The extracting unit 70111 includes: a word segmenting subunit 701111, a clustering subunit 701112 and a determining subunit 701113.

The word segmenting subunit 701111 is configured to obtain a word segmenting result by performing a word segmenting on the search text. The word segmenting result includes a plurality of words.

The clustering subunit 701112 is configured to perform a clustering process on the plurality of words contained in the word segmenting result, to obtain a plurality of word clustering results.

The determining subunit 701113 is configured to determine the keyword in the search text based on the plurality of word clustering results.

The determining subunit 701113 is further configured to determine respective clustering center words corresponding to the word clustering results; obtain term frequencies of the clustering center words in the search text; and determine the clustering center word with the highest term frequency as the keyword in the search text.

The second obtaining module 702 includes a third obtaining submodule 7021 and a determining submodule 7022.

The third obtaining submodule 7021 is configured to, for each user, obtain user feature information of the user on a service platform to which an object to be pushed of the resource belongs.

The determining submodule 7022 is configured to determine the predicted conversion rate of the resource for the user based on the user feature information.

The determining submodule 7022 is further configured to: obtain a conversion rate prediction model corresponding to the resource; and input the user feature information of the user into the conversion rate prediction model, to obtain the predicted conversion rate of the resource for the user.

It is noteworthy that the foregoing descriptions of the embodiments of the method for pushing a resource also apply to the apparatus for pushing a resource in this embodiment and is not repeated here.

According to embodiments of the disclosure, an electronic device, and a readable storage medium and a computer program product are provided.

It is noteworthy that collection, storage, use, processing, transmission, provision and disclosure of the user's personal information involved in the technical solutions disclosed herein are handled in accordance with relevant laws and regulations and are not contrary to public order and morality.

Figure 8:
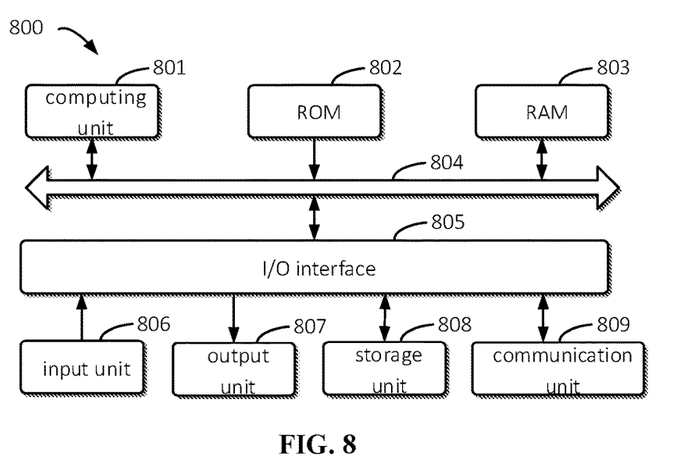
FIG. 8 is a block diagram illustrating an electronic device used to implement the method for pushing a resource according to some embodiments of the disclosure.

FIG. 8 is a block diagram illustrating an electronic device 800 used to implement the embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 8, the electronic device 800 includes: a computing unit 801 performing various appropriate actions and processes based on computer programs stored in a read-only memory (ROM) 802 or computer programs loaded from the storage unit 808 to a random access memory (RAM) 803. In the RAM 803, various programs and data required for the operation of the device 800 are stored. The computing unit 801, the ROM 802, and the RAM 803 are connected to each other through a bus 804. An input/output (I/O) interface 805 is also connected to the bus 804.

Components in the device 800 are connected to the I/O interface 805, including: an inputting unit 806, such as a keyboard, a mouse; an outputting unit 807, such as various types of displays, speakers; a storage unit 808, such as a disk, an optical disk; and a communication unit 809, such as network cards, modems, and wireless communication transceivers. The communication unit 809 allows the device 800 to exchange information/data with other devices through a computer network such as the Internet and/or various telecommunication networks.

The computing unit 801 may be various general-purpose and/or dedicated processing components with processing and computing capabilities. Some examples of computing unit 801 include, but are not limited to, a CPU, a graphics processing unit (GPU), various dedicated AI computing chips, various computing units that run machine learning model algorithms, and a digital signal processor (DSP), and any appropriate processor, controller and microcontroller. The computing unit 801 executes the various methods and processes described above, such as the method for pushing a resource. For example, in some embodiments, the method may be implemented as a computer software program, which is tangibly contained in a machine-readable medium, such as the storage unit 808. In some embodiments, part or all of the computer program may be loaded and/or installed on the device 800 via the ROM 802 and/or the communication unit 809. When the computer program is loaded on the RAM 803 and executed by the computing unit 801, one or more steps of the method described above may be executed. Alternatively, in other embodiments, the computing unit 801 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in combination with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage medium include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), the Internet and the block-chain network.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in the cloud computing service system, to solve defects such as difficult management and weak business scalability in the traditional physical host and Virtual Private Server (VPS) service. The server may also be a cloud server, a server for a distributed system, or a server combined with a block-chain.

It is noteworthy that AI is a subject that causes computers to simulate certain thinking processes and intelligent behaviors (such as learning, reasoning, thinking and planning) of human beings, which covers both hardware-level technologies and software-level technologies. The AI hardware technologies generally include technologies such as sensors, dedicated AI chips, cloud computing, distributed storage and big data processing. The AI software technologies generally include several major aspects such as computer vision technology, speech recognition technology, natural language processing technology, machine learning/deep learning, big data processing technology and knowledge graph technology.

It is understandable that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for pushing a resource, comprising:
   obtaining a collection of users to which a resource is to be pushed, wherein the collection comprises a plurality of users;
   obtaining respective predicted conversion rates of the resource for the plurality of users, wherein the predicted conversion rate is a predicted probability that after the resource is pushed to the user, the user clicks on the resource and completes a specified operation on a landing page corresponding to the resource;
   obtaining user groups by dividing the plurality of users into groups based on respective predicted conversion rates for the plurality of users, wherein the user groups correspond to different conversion rate ranges; and
   for each user group, selecting one or more target users from the user group based on a real conversion rate related to pushed users corresponding to the conversion rate range of the user group, and pushing the resource to the one or more target users,
   wherein selecting the one or more target users from the user group based on the real conversion rate comprises:
   multiplying the real conversion rate with a number of users comprised in the user group to obtain a product result as the number of users to be extracted, and randomly selecting the one or more target users from the user group based on the number of users to be extracted, in which the number of selected target users is equal to the number of users to be extracted.

2. The method of claim 1, wherein obtaining the collection of users to which the resource is to be pushed comprises:
obtaining user behavior data of converted users corresponding to the resource; and
obtaining the collection of users to which the resource is to be pushed based on the user behavior data.

3. The method of claim 2, wherein the user behavior data comprises a search text, and obtaining the collection of users to which the resource is to be pushed based on the user behavior data comprises:
extracting a keyword from the search text; and
generating the collection of users to which the resource is to be pushed based on users who have searched for the keyword and have not been pushed with the resource.

4. The method of claim 3, wherein extracting the keyword from the search text comprises:
obtaining a word segmenting result by performing a word segmenting on the search text, wherein the word segmenting result comprises a plurality of words;
obtaining a plurality of word clustering results by performing a clustering process on the plurality of words contained in the word segmenting result; and
determining the keyword in the search text based on the plurality of word clustering results.

5. The method of claim 4, wherein determining the keyword in the search text based on the plurality of word clustering results comprises:
determining respective clustering center words for the plurality of word clustering results;
obtaining term frequencies of the clustering center words in the search texts; and
determining the clustering center word with the highest term frequency as the keyword in the search text.

6. The method of claim 1, wherein obtaining the respective predicted conversion rates of the resource for the plurality of users comprises:
for each of the plurality of users, obtaining user feature information of the user on a service platform to which an object to be pushed of the resource belong; and
determining the predicted conversion rate of the resource for the user based on the user feature information.

7. The method of claim 6, wherein determining the predicted conversion rate of the resource for the user based on the user feature information comprises:
obtaining a conversion rate prediction model corresponding to the resource; and
inputting the user feature information of the user into the conversion rate prediction model, to obtain the predicted conversion rate of the resource for the user.

8. An electronic device, comprising:
at least one processor; and
a memory communicatively coupled to the at least one processor; wherein,
the memory stores instructions executable by the at least one processor, and when the instructions are executed by the at least one processor, the at least one processor is configured to:
obtain a collection of users to which a resource is to be pushed, wherein the collection comprises a plurality of users;
obtain respective predicted conversion rates of the resource for the plurality of users, wherein the predicted conversion rate is a predicted probability that after the resource is pushed to the user, the user clicks on the resource and completes a specified operation on a landing page corresponding to the resource;
obtain user groups by dividing the plurality of users into groups based on respective predicted conversion rates for the plurality of users, wherein the user groups correspond to different conversion rate ranges; and
for each user group, select one or more target users from the user group based on a real conversion rate related to pushed users corresponding to the conversion rate range of the user group, and push the resource to the target users,
wherein selecting the one or more target users from the user group based on the real conversion rate comprises:
multiplying the real conversion rate with a number of users comprised in the user group to obtain a product result as the number of users to be extracted, and randomly selecting the one or more target users from the user group based on the number of users to be extracted, in which the number of selected target users is equal to the number of users to be extracted.

9. The electronic device of claim 8, wherein the at least one processor is configured to:
obtain user behavior data of converted users corresponding to the resource; and
obtain the collection of users to which the resource is to be pushed based on the user behavior data.

10. The electronic device of claim 9, wherein the user behavior data comprises a search text, and the at least one processor is configured to:
extract a keyword from the search text; and
generate the collection of users to which the resource is to be pushed based on users who have searched for the keyword and have not been pushed with the resource.

11. The electronic device of claim 10, wherein the at least one processor is configured to:
obtain a word segmenting result by performing a word segmenting on the search text, wherein the word segmenting result comprises a plurality of words;
obtain a plurality of word clustering results by performing a clustering process on the plurality of words contained in the word segmenting result; and
determine the keyword in the search text based on the plurality of word clustering results.

12. The electronic device of claim 11, wherein at least one processor is configured to:
determine respective clustering center words for the plurality of word clustering results;
obtain term frequencies of the clustering center words in the search texts; and
determine the clustering center word with the highest term frequency as the keyword in the search text.

13. The electronic device of claim 8, wherein the at least one processor is configured to:
for each of the plurality of users, obtain user feature information of the user on a service platform to which an object to be pushed of the resource belong; and
determine the predicted conversion rate of the resource for the user based on the user feature information.

14. The electronic device of claim 13, wherein the at least one processor is configured to:
obtain a conversion rate prediction model corresponding to the resource; and input the user feature information of the user into the conversion rate prediction model, to obtain the predicted conversion rate of the resource for the user.

15. A non-transitory computer-readable storage medium storing computer instructions, wherein the computer instructions are configured to cause a computer to implement a method for pushing a resource, the method comprising:
obtaining a collection of users to which a resource is to be pushed, wherein the collection comprises a plurality of users;
obtaining respective predicted conversion rates of the resource for the plurality of users, wherein the predicted conversion rate is a predicted probability that after the resource is pushed to the user, the user clicks on the resource and completes a specified operation on a landing page corresponding to the resource;
obtaining user groups by dividing the plurality of users into groups based on respective predicted conversion rates for the plurality of users, wherein the user groups correspond to different conversion rate ranges; and
for each user group, selecting one or more target users from the user group based on a real conversion rate related to pushed users corresponding to the conversion rate range of the user group, and pushing the resource to the one or more target users,
wherein selecting the one or more target users from the user group based on the real conversion rate comprises:
multiplying the real conversion rate with a number of users comprised in the user group to obtain a product result as the number of users to be extracted, and randomly selecting the one or more target users from the user group based on the number of users to be extracted, in which the number of selected target users is equal to the number of users to be extracted.

16. The non-transitory computer-readable storage medium of claim 15, wherein obtaining the collection of users to which the resource is to be pushed comprises:
obtaining user behavior data of converted users corresponding to the resource; and
obtaining the collection of users to which the resource is to be pushed based on the user behavior data.

17. The non-transitory computer-readable storage medium of claim 16, wherein the user behavior data comprises a search text, and obtaining the collection of users to which the resource is to be pushed based on the user behavior data comprises:
extracting a keyword from the search text; and
generating the collection of users to which the resource is to be pushed based on users who have searched for the keyword and have not been pushed with the resource.

18. The non-transitory computer-readable storage medium of claim 17, wherein extracting the keyword from the search text comprises:
obtaining a word segmenting result by performing a word segmenting on the search text, wherein the word segmenting result comprises a plurality of words;
obtaining a plurality of word clustering results by performing a clustering process on the plurality of words contained in the word segmenting result; and
determining the keyword in the search text based on the plurality of word clustering results.

19. The non-transitory computer-readable storage medium of claim 18, wherein determining the keyword in the search text based on the plurality of word clustering results comprises:
determining respective clustering center words for the plurality of word clustering results;
obtaining term frequencies of the clustering center words in the search texts; and
determining the clustering center word with the highest term frequency as the keyword in the search text.

20. The non-transitory computer-readable storage medium of claim 15, wherein obtaining the respective predicted conversion rates of the resource for the plurality of users comprises:
for each of the plurality of users, obtaining user feature information of the user on a service platform to which an object to be pushed of the resource belong; and
determining the predicted conversion rate of the resource for the user based on the user feature information.

* * * * *